(12) United States Patent
Nory et al.

(10) Patent No.: US 8,934,417 B2
(45) Date of Patent: Jan. 13, 2015

(54) RESOURCE ALLOCATION IN WIRELESS COMMUNICATION SYSTEMS

(75) Inventors: Ravikiran Nory, Palatine, IL (US); Ravi Kuchibhotla, Gurnee, IL (US); Robert T. Love, Barrington, IL (US); Vijay Nangia, Algonquin, IL (US); Ajit Nimbalker, Arlington Heights, IL (US); Kenneth A. Stewart, Grayslake, IL (US); Xiangyang Zhuang, Lake Zurich, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 964 days.

(21) Appl. No.: 12/405,046

(22) Filed: Mar. 16, 2009

(65) Prior Publication Data

US 2010/0232373 A1 Sep. 16, 2010

(51) Int. Cl.
*H04W 4/00* (2009.01)
*H04J 3/00* (2006.01)
*H04W 72/12* (2009.01)
*H04W 72/04* (2009.01)

(52) U.S. Cl.
CPC ........ *H04W 72/1289* (2013.01); *H04W 72/042* (2013.01)
USPC .......................................................... 370/329

(58) Field of Classification Search
None
See application file for complete search history.

(56) References Cited

U.S. PATENT DOCUMENTS

| 8,238,818 | B2 | 8/2012 | Karabinis et al. |
| 2006/0274712 | A1 | 12/2006 | Malladi et al. |
| 2008/0310359 | A1 | 12/2008 | McBeath et al. |
| 2010/0091678 | A1* | 4/2010 | Chen et al. ..................... 370/252 |
| 2010/0142455 | A1* | 6/2010 | Imamura ....................... 370/329 |
| 2010/0227569 | A1* | 9/2010 | Bala et al. ....................... 455/73 |
| 2010/0254329 | A1* | 10/2010 | Pan et al. ....................... 370/329 |
| 2011/0194501 | A1 | 8/2011 | Chung et al. |
| 2011/0201333 | A1 | 8/2011 | Kwon et al. |
| 2011/0267978 | A1 | 11/2011 | Etemad |
| 2012/0009923 | A1 | 1/2012 | Chen et al. |
| 2012/0208583 | A1 | 8/2012 | Chung et al. |
| 2013/0010619 | A1 | 1/2013 | Fong et al. |

FOREIGN PATENT DOCUMENTS

| CN | 101099305 A | 1/2008 |
| EP | 1944896 A1 | 7/2008 |

(Continued)

OTHER PUBLICATIONS

Fujitsu, Anchor component carrier and preferred control signal structure, Jan. 2009, 3GPP TSG-RAN1 #56bis, R1-091503, all pages.*

(Continued)

*Primary Examiner* — Chirag Shah
*Assistant Examiner* — Srinivasa Reddivalam
(74) *Attorney, Agent, or Firm* — Faegre Baker Daniels LLP

(57) ABSTRACT

A wireless communication terminal including a controller coupled to a transceiver, configured to receive a first and second control messages on an anchor carrier is disclosed. The first control message includes a resource assignment for the anchor carrier and the second control message is associated with a set of component carriers that are distinct from the anchor carrier. The controller determines a resource assignment for at least one component carrier in the set of component carriers using both the first and the second control messages.

22 Claims, 3 Drawing Sheets

(56) References Cited

FOREIGN PATENT DOCUMENTS

| KR | 1020090033001 A | 4/2009 |
|---|---|---|
| WO | 2008083804 A2 | 7/2008 |
| WO | 2008157692 A2 | 12/2008 |
| WO | 2011102686 A2 | 8/2011 |

OTHER PUBLICATIONS

TSG-RAN WG1 #53bis; Warsaw, Poland, Jun. 30-Jul. 4, 2008; Carrier Aggregation in LTE-Advanced; Ericsson R1-082468.
R1-082380; Jul. 2008; Technical Scope for LTE-Advanced Evolution; ZTE Corporation.
3GPP TSG RAN WG1 Meeting #54bis; Prague, Czech Republic, Sep. 29-Oct. 3, 2008; DL Layered Control Signal Structure in LTE-Advanced; R1-083681.
3GPP TS 36.212 V8.5.0 (Dec. 2008) 3rd Generation Partnership Project; Technical Specification Group Radio Access Network; Evolved Universal Terrestrial Radio Access (E-UTRA); Multiplexing and Channel Coding (Release 8); Section 5.3.3.1.
3GPP TS36.213 V8.5.0 (Dec. 2008) 3rd Generation Partnership Project; Technical Specification Group Radio Access Network; Evolved Universal Terrestrial Radio Access (E-UTRA); Physical Layer Procedures (Release 8); Section 6.2.
Patent Cooperation Treaty, "PCT Search Report and Written Opinion of the International Searching Authority" for International Application No. PCT/US2011/025155 Aug. 1, 2011, 11 pages.
3GPP TSG RAN WG1 #59, R1-094829 "PDCCH Monitoring lor LTE-A" Motorola, Jeju, Korea, Nov. 9-13, 2009, 4 pages.
3GPP TSG RAN2 #67bis, R2-095576 "Component Carrier Configuration/Activation for Carrier Aggregation" NEC, Miyazaki, Japan, Oct. 12-16, 2009, 4 pages.
3GPP TSG RAN WG2 #68, R2-096752 "Activation and Deactivation of Component Carriers" Ericsson, ST-Ericsson, Jeju, Korea, Oct. 9-13, 2009, 4 pages.
3GPP TSG RAN WG1 #59, R1-094830 "PDCCH Design for Cross-Carrier Operation Using CIF" Motorola, Jeju, Korea, Nov. 9-13, 2009, 4 pages.
3GPP TSG RAN WG1 #69, R2-101537 "UE Assignment Methods During CIF Configuraiton" NTT DOCOMO, Inc., San Francisco, USA Feb. 22-26, 2010, 3 pages.
3GPP TSG RAN WG1 #69, R2-101534 "DL and UL CC Linkage for Carrier Aggregation" NTT Docomo, Inc., San Francisco, USA Feb. 22-26, 2010, 6 pages.
Japanese Patent Office "Office Action" for Japanese Patent Application No. 2012-508761 dated Feb. 12, 2013, 2 pages.
3GPP TSG RAN WG1 #52bis, R1-081212 "UE-specific search space" Samsung; Shenzhen, China; Mar. 31-Apr. 4, 2008; 7 pages.
Korean Intellectual Property Office, "KIPO's Notice of Preliminary Rejection", Korean Pat. Appln. No. 10-2011-7026269, Apr. 2, 2013, 11 pages.
3GPP TSG RAN WG1 #56bis, R1-091168 "PDCCH coding and mapping for carrier aggregation" Panasonic; Seoul, Korea; Mar. 23-27, 2009, 5 pages.
United States Patent & Trademark Office "Non-Final Office Action" for U.S. Appl. No. 12/709,476 dated Mar. 15, 2013, 14 pages.
United States Patent & Trademark Office "Final Rejection" for U.S. Appl. No. 12/709,476 dated Aug. 26, 2013, 19 pages.
3GPP TSG RAN WG1 Meeting #58; "Carrier Indication for Carrier Aggregation"; Shenzhen, China, Aug. 24-Aug. 28, 2009; R1-093296; 4 pages.
3GPP TSG RAN WG1 Meeting #59bis; "Further Discussion on PDCCH with Cross Carrier Operation"; Valencia, Spain, Jan. 18-22, 2010; R1-100361; 6 pages.
Motorola, "PDCCH Search Space Assignment Hashing Function", 3GPP TSG RAN1 #52bis R1-081672, Mar. 31-Apr. 4, 2008, pp. 1-7, vol. 6.1.3, Shenzhen, China.
Motorola, "PDCCH Search Space Assignment Hashing Function", 3GPP TSG RAN1 #52bis, R1-081289, Mar. 31-Apr. 4, 2008, pp. 1-4, vol. 6.1.3, Shenzhen, China.
Motorola, "PDCCH Search Space Assignment Hashing Function", 3GPP TSG RAN1 #52bis, R1-081586, Mar. 31-Apr. 4, 2008, pp. 1-6, vol. 6.1.3, Shenzhen, China.
Motorola, "E-UTRA DL L1/L2 Control Channel Design", 3GPP TSG RAN1 #48; St. Louis, USA; Feb. 12-16, 2007; R1-070787.
Motorola, "Search Space Definition for L1/L2 Control Channels", 3GPP TSG RANi #50; Athens, Greece; Aug. 20-24, 2007; R1-073373.
Ericsson, Qualcomm, Nokia, TI, NTT Docomo, Motorola, Panasonic, Siemens, Samsung, Nortel, ZTE, LGE Huawei, Alcatel-Lucent, Freescale, "Way Forward on Downlink Control Signaling", Agenda Item 6.9.2; Feb. 14, 2007; R1-071223.
Love et al., "Control Channel Provisioning and Signaling" USPTO U.S. Appl. No. 12/435,145, filed May 4, 2009, 34 pages.
Nory et. al., "Multi-Carrier Control Signaling in Wireless Communication System" USPTO U.S. Appl. No. 12/709,476, filed Feb. 20, 2010, 29 pages.
Hashing Functions Performance in Packet Classification; Mahmood Ahmadi and Stephan Wong; Computer Engineering Laboratory; Faculty of Electrical Engineering, Mathematics and Computer Science; Delft University of Technology, 2007, 6 pages.
Patent Cooperation Treaty, "PCT Search Report and Written Opinion of the International Searching Authority" for International Application No. PCT/US2010/026500 Dec. 16, 2010, 11 pages.
Patent Cooperation Treaty, "PCT Search Report and Written Opinion of the International Searching Authority" for International Application No. PCT/US2010/033079 Aug. 26, 2010, 15 pages.
"PDCCH blind decoding—Outcome of offline discussions" Ericsson Feb. 11, 2008, R1-081101, 8 pages.
3GPP TSG RAN WG1 Meeting #52bis, Shenzhen, China, Mar. 31-Apr. 4, 2008, "Analysis of search space design for PDCCH blind decoding" Philips, Tdoc R1-081504, 6 pages.
3GPP TSG RAN1 #51bis, Sevilla, Spain, Jan. 14-18, 2008 "Search Space Definition: Reduced PDCCH Blind Detection for Split PDCCH Search Space" Motorola, R1-080079, 4 pages.
3GPP TSG RAN WG1, #51bis, "Reducing the Decoding complexity of the PDCCH", R1-080303, Jan. 14-18, 2008, 8 pages.
Instituto Mexicano de la Propiedad Industrial, "Rejection", Mexican Pat. Appln. No. Mx/a/2011/011462, Jan. 17, 2013, 5 pages, Including E-mail Providing English Summary of Rejection From Foreign Associate.
The State Intellectual Property Office of the People'S Republic of China, "Notification of the First Office Action" for Patent Application No. 201080019633.7 dated 25 Dec. 2013, 12 pages.

\* cited by examiner

RESOURCE ALLOCATION IN WIRELESS COMMUNICATION SYSTEMS

FIELD OF THE DISCLOSURE

The present disclosure relates generally to wireless communications and, more particularly, to radio resource allocation to wireless terminals in wireless communication systems.

BACKGROUND

It is anticipated that some wireless communications protocols will support spectrum aggregation wherein a compliant user terminal, also referred to as user equipment (UE), will be expected to receive data on multiple component carriers in a single sub-frame. One such protocol is 3GPP LTE-Advanced (LTE-A). Existing control signaling schemes for LTE Release 8 can only be used to allocate resources to a UE on only a single Release 8 compliant carrier.

U.S. Publication 2006/0274712 entitled "Multi-carrier Operation In Data Transmission Systems" discloses a method and apparatus for preserving compatibility of legacy devices when adding multi-carrier capability to single carrier communication systems. Recent LTE RAN WG1 contributions R1-082468, R1-082380 and R1-083681 describe high level principles for resource allocation in LTE-A. These publications however do not explicitly describe a control signaling scheme.

The various aspects, features and advantages of the invention will become more fully apparent to those having ordinary skill in the art upon a careful consideration of the following Detailed Description thereof with the accompanying drawings described below. The drawings may have been simplified for clarity and are not necessarily drawn to scale.

DETAILED DESCRIPTION

Figure 1:
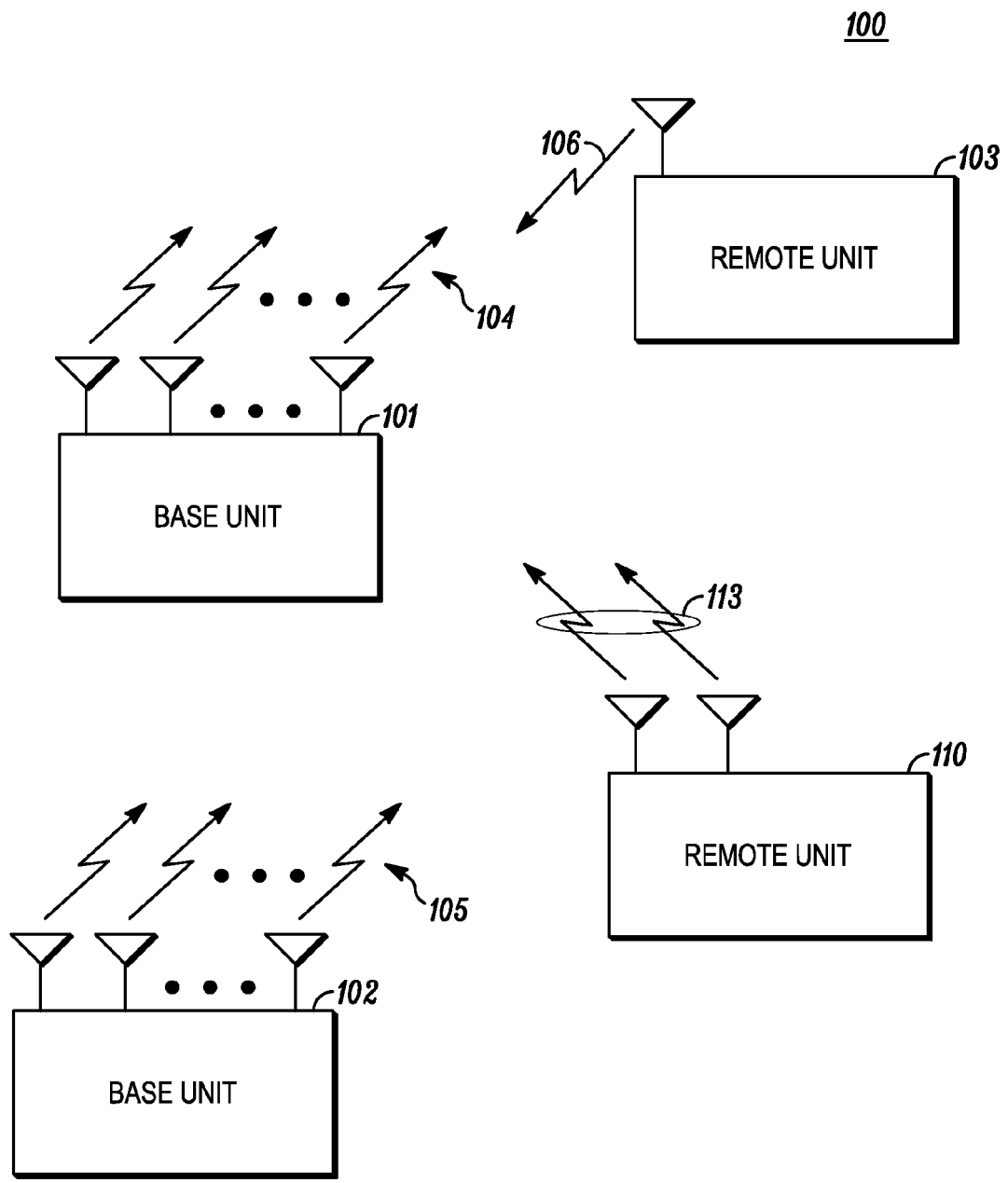
FIG. 1 illustrates a wireless communication system.

In FIG. 1, a wireless communication system 100 comprises one or more fixed base infrastructure units 101, 102 forming a network distributed over a geographical region for serving remote units in the time and/or frequency domain. A base unit may also be referred to as an access point, access terminal, base, base station, Node-B, eNode-B or by other terminology used in the art. The one or more base units each comprise one or more transmitters for downlink transmissions 104, 105 and one or more receivers for receiving uplink transmissions. The base units are generally part of a radio access network that includes one or more controllers communicably coupled to one or more corresponding base units. The access network is generally communicably coupled to one or more core networks, which may be coupled to other networks, like the Internet and public switched telephone networks, among other networks. These and other elements of access and core networks are not illustrated but they are well known generally by those having ordinary skill in the art.

In FIG. 1, the one or more base units serve a number of remote units 103, 110 within a corresponding serving area, for example, a cell or a cell sector via a wireless communication link. The remote units may be fixed units or mobile terminals. The remote units may also be referred to as subscriber units, mobiles, mobile stations, users, terminals, subscriber stations, user equipment (UE), user terminals, or by other terminology used in the art. The remote units also comprise one or more transmitters and one or more receivers. In FIG. 1, the base unit transmits downlink communication signals to serve remote unit 102 in the time and/or frequency domain. The remote unit 102 communicates directly with base unit 110 via uplink communication signals. A remote unit 108 communicates directly with base unit 112.

In one implementation, the wireless communication system is compliant with the Third Generation Partnership Project (3GPP) Universal Mobile Telecommunications System (UMTS) Long Term Evolution (LTE) protocol, also referred to as EUTRA or 3GPP LTE Release-8 (Rel-8) or some later generation thereof, wherein the base unit transmits using an orthogonal frequency division multiplexing (OFDM) modulation scheme on the downlink and the user terminals transmit on the uplink using a single carrier frequency division multiple access (SC-FDMA) scheme. More generally, however, the wireless communication system may implement some other open or proprietary communication protocol, for example, WiMAX, among other protocols. The disclosure is not intended to be limited to the implementation of any particular wireless communication system architecture or protocol.

Figure 2:
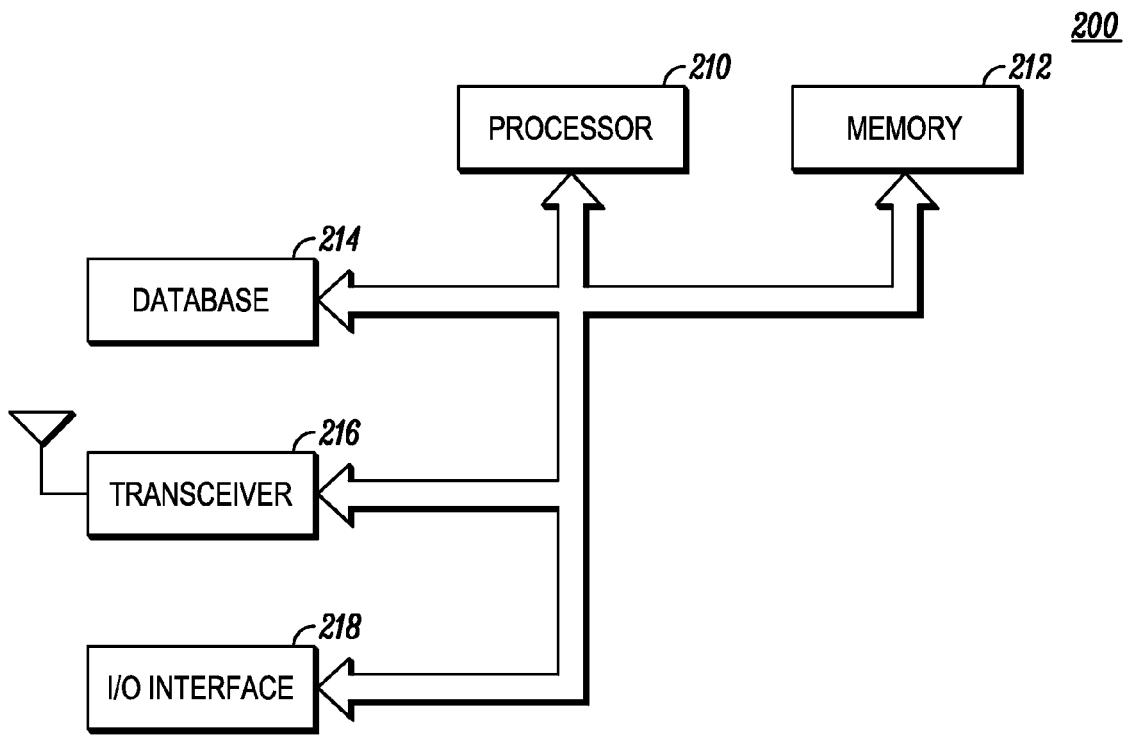
FIG. 2 illustrates a schematic block diagram of a user terminal.

In FIG. 2, a user terminal (UE) 200 comprises a controller/processor 210 communicably coupled to memory 212, a database 214, a transceiver 216, input/output (I/O) device interface 218 connected through a system bus 220. The UE is compliant with the protocol of the wireless communication system within which it operates, for example, the 3GPP LTE Rel-8 or a later generation protocol discussed above. In FIG. 2, the controller/processor 210 may be implemented as any programmed processor. However, the functionality described herein may also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In FIG. 2, the memory 212 may include volatile and nonvolatile data storage, including one or more electrical, magnetic or optical memories such as a random access memory (RAM), cache, hard drive, read-only memory (ROM), firmware, or other memory device. The memory may have a cache to speed access to specific data. Data may be stored in the memory or in a separate database. The database interface 214 may be used by the controller/processor to access the database. The transceiver 216 is capable of communicating with user terminals and base stations pursuant to the wireless communication protocol implemented. The I/O device interface 218 connects to one or more input devices that may include a keyboard, mouse, pen-operated touch screen or monitor, voice-recognition device, or any other device that accepts input. The I/O device interface may also connect to one or more output devices, such as a monitor, printer, disk drive, speakers, or any other device provided to output data.

According to one aspect of the disclosure, a wireless communication infrastructure entity, for example, a base station transmits a first control message on an anchor carrier, wherein the first control message includes a resource assignment for the anchor carrier. The base station also transmits a second control message on the anchor carrier. The second control message is associated with a set of component carriers, wherein the set of component carriers are distinct from the anchor carrier. In this regard, the wireless communication infrastructure entity generally comprises a controller that configures a transceiver to transmit a first control message on the anchor carrier and the controller configures the transceiver to transmit a second control message on the anchor carrier wherein the first and second control messages are transmitted such that a resource assignment for the set of component carriers can be determined using the first and second control messages. An anchor carrier is one of the component carriers that a UE is directed to monitor or is capable of monitoring. For example, a Re-8 LTE UE would only be capable of monitoring a Rel-8 compatible LTE carrier but not necessarily a Rel-9 carrier or a carrier supporting a subsequent release of the LTE specification. In this case the UE monitors the control region (first "n" symbols of each sub-frame) of its anchor carrier and may not monitor the control region of other (non-anchor) component carriers. Monitoring includes trying to blindly detect control channels called PDCCH in the control region.

Figure 3:
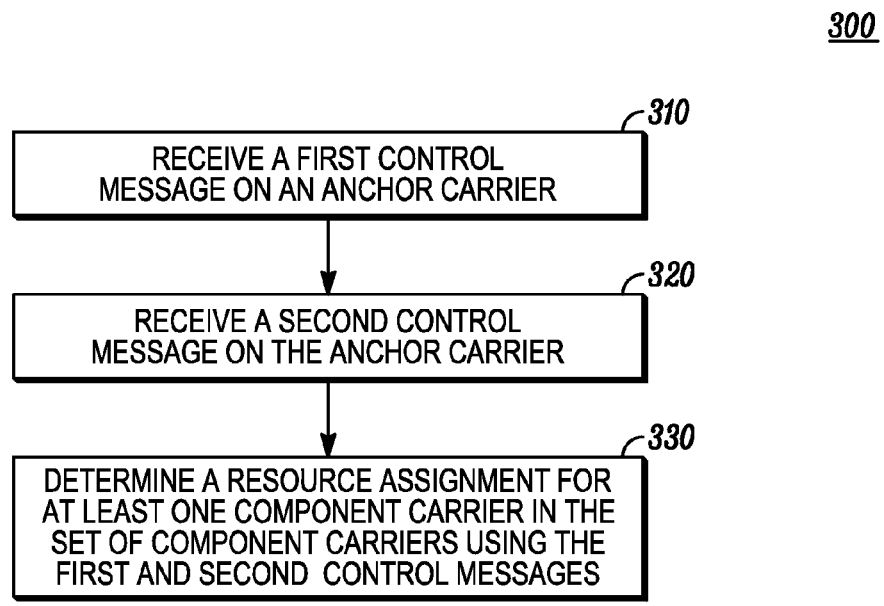
FIG. 3 illustrates a process flow diagram.

In the process flow diagram 300 of FIG. 3, at 310, a wireless communication terminal receives a first control message on an anchor carrier. The first control message includes a resource assignment for the anchor carrier. At 320, the terminal also receives a second control message on the anchor carrier, wherein the second control message is associated with the set of component carriers. The set of component carriers are distinct from the anchor carrier.

In one embodiment, the base station transmits the first and second control messages as separate first and second physical downlink control channel (PDCCH) messages. According to this embodiment, the wireless communication terminal receives the first and second control messages as first and second PDCCH messages. More generally, however, the first and second control messages may be some other type of message. In one implementation, the first control message is communicated as a PDCCH message selected from a group of downlink control information [DCI] formats comprising: [0]; [1]; [1A]; [1B]; [1C]; [1D]; [2] or [2A]. Such DCI formats are described in 3GPP TS 36.212, section 5.3.3.1.

In one embodiment, the base station is configured to transmit a message identifying the set of component carriers associated with the anchor carrier. Such a message may indicate to the user terminal where resource allocations are expected. In one embodiment, the message identifying the set of component carriers is embedded within a PDCCH message.

In FIG. 3, at 330, the terminal determines a resource assignment for at least one component carrier in the set of component carriers using both the first and the second control messages. More generally, the terminal determines a resource assignment for each component carrier in the set of component carriers using both the first and the second control messages. In one implementation, the resource assignment for at least one component carrier in the set of component carriers is determined using both the first and the second control messages based on bit map information. The bit map information may indicate the presence and/or absence of the resource assignment for the component carrier. In one implementation, the bit map information constitutes part of the first or second control messages.

In one implementation, the base station is configured to encode the first control message using a first mask scrambled with a first identifier and to encode the second control message using a second mask scrambled with a second identifier. In one embodiment, the first and second masks are first and second cyclic redundancy check (CRC) masks and the first and second identifiers are first and second Cell-Radio Network Temporary Identifiers (C-RNTI). The user terminal thus identifies the first control message for the anchor carrier using a first CRC mask scrambled with a first identifier, and the user terminal identifies the second control message is using a second CRC mask scrambled with a second identifier. In an alternate embodiment, the first and second identifiers are predefined identifiers, e.g., integer 0 and 1, respectively, that are combined with the UE Cell-Radio Network Temporary Identifier (C-RNTI).

In one implementation, the second control message includes resource assignment type information indicating how to interpret the second control message. In one embodiment, the resource type information is in the form of offset information. In one implementation, the second control message includes a resource assignment offset for at least one component carrier in the set of component carriers. For example, the offset could be an offset relative to the resource assignment for the anchor carrier. Thus the wireless communication terminal determines the resource assignment for one or more component carriers in the set of component carriers using the resource assignment offset in the second control message. In a more particular implementation, the second control message includes a modulation coding scheme (MCS) offset for at least one component carrier in the set of component carriers. The MCS offset could be an offset relative to the MCS for the anchor carrier or relative to some other reference. According to this implementation, the resource assignment is determined for the one or more component carriers in the set of component carriers using the modulation coding scheme offset in the second control message.

In another implementation, the second control message includes information for at least one component carrier wherein the information is selected from a group comprising a hybrid automatic repeat request (HARQ) process identity, a new data indicator, and a redundancy version (RV). The wireless communication terminal then determines the resource assignment for at least one component carrier in the set of component carriers using the information in the second control message.

In one embodiment, the functionality performed by the wireless communication terminal during the implementation of the process of FIG. 3 is performed by a processor or controller executing instructions such as program modules, routines, objects, components, data structures stored in memory wherein the processor or controller performs particular tasks or implements corresponding functions. Alternatively, this functionality may be performed by equivalent hardware elements or a combination of hardware and software elements as suggested above.

In a first exemplary implementation, the base station configures the UE via radio resource control (RRC) signaling with an anchor carrier. The UE is expected to only monitor PDCCH messages from the anchor carrier after initial access. Before assigning resources on non-anchor component carriers via individual PDCCH in each component carrier, base unit sends a configuration message to the UE instructing the UE the set of component carriers whose PDCCH messages are also expected to be monitored. The UE is expected to monitor the PDCCH of those component carriers that have been activated by the last received configuration message. The configuration message is signaled to the UE via higher layer signaling, for example a radio resource control (RRC) message. In an alternative embodiment, the configuration message is signaled to the UE via physical layer signaling on a physical downlink shared channel (PDSCH) of the UE's anchor carrier. According to this alternative, a portion of PDSCH resource elements (REs) are punctured to transmit the configuration message.

In one embodiment, the information in the configuration message is a long term bitmap, with each bit corresponding to each component carrier in the set of component carriers that are configured. The UE is expected to monitor the PDCCH of only those component carriers whose bit is set. Alternatively, the information in the configuration message is a single bit. According to this alternative embodiment, the UE is expected to monitor the PDCCH of all the configured component carriers only if the single bit is set.

In a second exemplary implementation, the base station configures the UE via radio resource control (RRC) signaling with an anchor carrier. The UE is expected to only monitor PDCCH messages from the anchor carrier after initial access. Before assigning resources on non-anchor component carriers via individual PDDCH messages in each component carrier, the base station or unit sends a configuration message to the UE, instructing the UE the set of component carriers whose a PDCCH messages are also expected to be monitored. The UE is expected to monitor the PDCCH messages of those component carriers that have been activated by the last received configuration message. In this implementation, the configuration message is signaled to the UE via physical layer signaling on the physical downlink control channel (PDCCH) of anchor carrier. The configuration message is embedded within an activation PDCCH message (PDCCH-A) and signaled to the UE. The size of the PDCCH-A message can the same as the existing 3GPP LTE Rel-8 Downlink control information (DCI) format sizes, for example, Format 1C or Format 1A as described in the 3GPP LTE Rel-8 specification TS 36.212, section 5.3.3.1, or a new format with some other size. If the size of PDCCH-A is the same as the existing LTE Rel-8 DCI format sizes, a LTE-A UE can detect PDCCH-A with reduced complexity as the unique number of PDCCH message sizes the UE has to detect is reduced. In some embodiments, the UE identifies the PDCCH-A using a using a LTE Rel-10 specific Cell-Radio Network Temporary Identifier (C-RNTI) assigned to it by the base station. The C-RNTI is used by the base station to scramble the Cyclic Redundancy Check (CRC) bits used for error detection coding of PDCCH-A message.

In one embodiment, the information in the configuration message is a long term bitmap (or a single bit) indicating the component carriers whose PDCCH the UE is expected to monitor. Optionally, an embedded uplink grant can also be included in the configuration message along with the long term bitmap. The embedded uplink grant instructs the UE to send channel Quality information (CQI) for the set of component carriers identified in the long term bitmap. If the configuration message is embedded in PDCCH-A, the uplink grant can be made compact and also embedded in PDCCH-A in a manner similar to embedding a Random Access Channel (RACH) response message in a PDCCH as described in the LTE Rel-8 specification (3GPP TS 36.213, Section 6.2). The PDCCH-A can also include or indicate resources for acknowledging the transmission of the configuration message to increase the reliability of signaling of the configuration message. Optionally, the base unit can also instruct the UE to send CQI for the set of component carriers identified in the long term bitmap by signaling a CQI-only uplink grant in the same sub-frame where PDCCH-A is transmitted. The configuration message can also optionally include a time offset limit before which the UE should configure its receiver to monitor PDCCH messages from multiple component carriers. The time offset limit could be signaled as a number of sub-frames. Such a time offset limit can help the base unit and the UE identify exactly when the UE will be ready to monitor PDCCH messages from multiple component carriers.

In one embodiment to increase the reliability of PDCCH-A reception, the base station assigns resources to the UE on component carriers activated by PDCCH-A only after receiving feedback from the UE. The feedback can be either ACK/DTX/NACK. A NACK can be signaled by the UE to reject the configuration message from the base unit based on current measurements or based on co-existence optimization. Feedback transmission from the UE is possible on the physical uplink control channel/physical uplink shared channel (PUCCH/PUSCH) of the anchor carrier. The PUCCH resource index implicitly assigned to the UE by the base station based on the lowest index of the Control Channel Element (CCE) on which PDCCH-A is transmitted. When a PDSCH is also scheduled to the UE in the same sub-frame as the PDCCH-A, multiple ACK/NACKs (one each for PDCCH-A and the PDSCH) can be transmitted using multiple PUCCH resources. Alternatively, multiple ACK/NACKS can be transmitted using ACK/NACK bundling or ACK/NACK channel selection. With a concurrent uplink Physical Uplink Shared Channel (PUSCH) transmission, multiple ACK/NACKs can be accommodated by puncturing the PUSCH transmission. Alternatively, in order to avoid transmission of concurrent ACK/NACKs, a scheduler restriction can be used to not schedule PDSCH in sub-frames on which the PDCCH-A is sent. Optionally, the base station may signal the PDCCH-A more than once to the UE in the same sub-frame to increase reliability of PDCCH-A reception.

In a third exemplary implementation, the base station configures the UE via radio resource control (RRC) signaling with an anchor carrier. The UE is expected to only monitor the anchor carrier after initial access. Before assigning resources on component carriers other than the anchor carrier, the base unit sends a configuration message to the UE, instructing it the set of component carriers where PDSCH resource allocations are expected. The configuration message allows the UE to semi-statically configure its receiver to receive the PDSCH on the set of component carriers. The configuration message can be signaled to the UE via RRC signaling. Alternatively, the configuration message can be embedded within an activation PDCCH message (PDCCH-A) and signaled to the UE.

In one embodiment, the information in the configuration message can contain a bitmap (or a single bit) indicating the component carriers on which the PDSCH assignments are expected (long term bitmap). Optionally, an embedded uplink grant can also be included in the configuration message along with the long term bitmap. The embedded uplink grant for example instructs the UE to send Channel Quality information (CQI) for the set of component carriers identified in the long term bitmap. Such an uplink grant can be made compact and embedded in the activation PDCCH message in a manner similar to embedding a Random Access Channel (RACH) response message in a PDCCH as described in the LTE Rel-8 specification (3GPP TS 36.213, Section 6.2). The PDCCH-A can also include or indicate resources for acknowledging its transmission to increase reliability. Optionally, the base unit can also instruct the UE to send CQI for the set of component carriers identified in the long term bitmap by signaling a CQI-only uplink grant in the same sub-frame where PDCCH-A is transmitted. Optionally, the configuration message can also include a time offset limit before which the UE should semi-statically configure its receiver to receive PDSCH on multiple component carriers. The time offset limit could be signaled as a number of sub-frames. Such a time offset limit can help the base unit and the UE identify exactly when the UE will be ready to receive PDSCH on multiple component carriers.

To assign resources on multiple component carriers using only the anchor carrier, the base station signals the UE using a first PDCCH message with a Rel-8 complaint DCI format (PDCCH-1) that includes a resource assignment for the anchor carrier and an additional second PDCCH message in the same sub-frame with multi-component carrier information (PDCCH-2). A Rel-8 compliant DCI format can be one of DCI format 0, 1, 1A, 1B, 1C, 2 or 2A as described in the LTE Rel-8 specification 3GPP TS 36.212, Section 5.3.3.1. While contents of PDCCH-2 messages will be different from Rel-8 PDDCH messages, the size of PDCCH-2 messages can be the same as one of the existing Rel-8 complaint DCI format sizes. This may be beneficial to reduce the number of distinct PDDCH message sizes that a LTE-A UE has to blindly decode.

The information in the PDCCH-2 message can be a bitmap indicating the presence or absence of assigned PDSCH resources in each component carrier. The bitmap is valid for only the current sub-frame. Optionally, the information may be a resource allocation offset for each component carrier, or a modulation coding scheme (MCS) offset for each component carrier, or a New Data Indicator (NDI), Redundancy Version indicator (RV) or a Hybrid ARQ process number (HARQ ID) for each component carrier.

Figure 4:
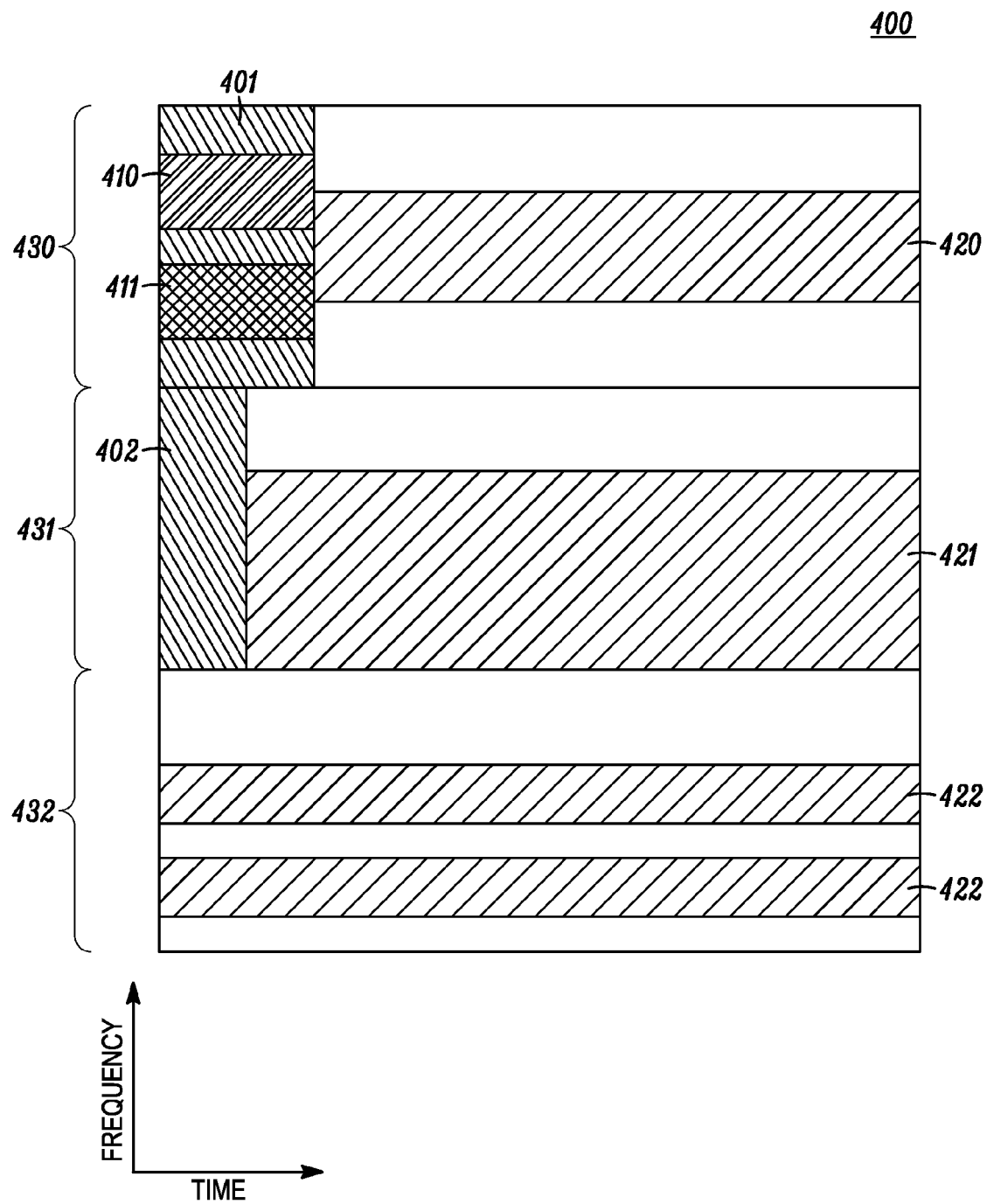
FIG. 4 illustrates a sub-frame with control signaling for multi-carrier operation

FIG. 4 illustrates a sub-frame 400 in which the PDCCH-1 message 410 and the PDCCH-2 message 411 are signaled. A LTE-A UE detects the PDCCH-1 message 410 in the sub-frame by monitoring the PDCCH region 401 of the anchor carrier 430. The UE can identify the PDCCH-1 message 410 using a LTE Rel-8 specific Cell-Radio Network Temporary Identifier (C-RNTI) assigned to it by the base station. The C-RNTI is used to scramble the Cyclic Redundancy Check (CRC) bits used for error detection coding of PDCCH messages. The UE uses Downlink Control Information (DCI) fields in the PDCCH-1 message 410 to determine its PDSCH resource assignment 420 for the anchor carrier 430. The UE further detects PDCCH-2 message 411 also in the PDCCH region 401 of the anchor carrier 430. The UE can identify the PDCCH-2 411 using, for example, a LTE Rel-10 specific C-RNTI assigned to it by the base station. The UE uses DCI information in the PDCCH-2 411 and DCI information in the PDCCH-1 410 to determine its PDSCH resource assignment 421 for the first component carrier 431 and the PDSCH resource assignment 422 for the second component carrier 432. More generally, the UE can use DCI information in both the PDCCH-1 and the PDCCH-2 messages to determine its PDSCH resource allocations in a set of component carriers that it has been configured to receive. Since both the PDCCH-1 message 410 and the PDCCH-2 message 411 are signaled to the UE on the anchor carrier 430, the UE is not required to monitor the PDCCH region of the component carriers (e.g., PDCCH region 402 of first component carrier 431). This allows the base unit to not configure a PDCCH region in every component carrier thereby reducing control signaling overhead. For example, in FIG. 4 the second component carrier 432 is not configured with a PDDCH region.

Table 1 below shows contents of an exemplary PDCCH-1 message with a LTE Rel-8 compliant DCI format—'Format 1' as described in 3GPP TS 36.212, section 5.3.3.1.2 assuming a 20 MHz anchor carrier bandwidth.

TABLE 1

Contents of PDCCH-1 message with DCI Format 1

| Field identifier | Number of bits |
|---|---|
| Resource allocation header | 1 |
| Resource Block assignment | 25 |
| MCS | 5 |
| HARQ process number | 3 |
| New Data Indicator | 1 |
| RV | 2 |
| TPC command for PUCCH | 2 |
| CRC (scrambled with Rel-8 C-RNTI) | 16 |
| Total | 55 |

Table 2 below shows contents of an exemplary PDCCH-2 message with multi-component carrier specific information for the cases where the UE is configured to receive a PDSCH resource allocation on a set of one or on a set of two component carriers in addition to the anchor carrier.

TABLE 2

Contents of PDCCH-2 message (for a UE configured with a set of 1 or a set of 2 component carriers)

| Field identifier | Bit field configuration for one component carrier | Bit field configuration for two component carriers |
|---|---|---|
| Resource allocation header (optional) | 1 × 1 = 1 | 2 × 1 = 2 |
| Resource Block assignment (offset) | 1 × 28 = 28 | 2 × 10 = 20 |
| MCS (offset) | 1 × 4 = 4 | 2 × 4 = 8 |
| HARQ process number (optional) | 0 | 0 |
| New Data Indicator | 1 × 1 = 1 | 2 × 1 = 2 |
| Redundancy version | 1 × 2 = 2 | 2 × 2 = 4 |
| Padding bits (optional) | 3 | 3 |
| CRC (scrambled with Rel10 C-RNTI) | 16 | 16 |
| Total | 55 | 55 |

If the UE is configured to receive PDSCH on one component carrier in addition to the anchor carrier, the UE can interpret the bits assigned to each DCI field in PDCCH-2 as shown in the "Bit field configuration for one component carrier" column in Table 2. If the UE is configured to receive the PDSCH on a set of two component carriers in addition to the anchor carrier, the UE can interpret the bits assigned to each DCI field in the PDCCH-2 as shown in the "Bit field configuration for two component carriers" column in Table 2.

The 'MCS (offset)' bits signal the modulation and coding scheme (MCS) used for the PDSCH resource assignment of each component carrier. The number of bits used to signal the MCS of the resource assignment of each component carrier can be reduced by signaling an offset value that corresponds to an offset to the MCS value signaled for the anchor carrier resource assignment in PDCCH-1.

The 'Resource allocation header' bits can be used to signal additional information to the UE giving it information on how to interpret the Resource Block assignment bits. Based on the value signaled in the resource allocation header bits, the UE can choose an appropriate mapping function to map the RB assignment bits to a set of RB indices assigned for the PDSCH transmission. For example, the resource allocation header bits can indicate to the UE to use either a "type 0" mapping function or a "type 1" mapping function as described in 3GPP TS 36.213, section 7.1.6. Alternatively, if the resource allocation header bits are not signaled in the PDCCH-2, the UE can use the resource allocation header bit in the PDCCH-1 message to determine the mapping function. In a different example, the resource allocation header bits can indicate to the UE to use the same RB assignment of the anchor carrier signaled in the PDCCH-1 (identical assignment) is also used on the component carriers. In this case, when the resource allocation header bits can indicate to the UE to replicate the RB assignment of the anchor carrier, additional RB assignment bits are not required in the PDCCH-2.

The RB assignment bits signal the resource blocks assigned to the UE for receiving the PDSCH transmissions within each component carrier. The UE can choose an appropriate mapping function to map the RB assignment bits to a set of RB indices assigned for PDSCH transmission. The mapping function can be a "type 0" mapping function or a "type 1" mapping function or a "type2" mapping function as described in 3GPP TS 36.213, section 7.1.6. For example, if the UE is configured to receive the PDSCH on a set of two component carriers, a first set of ten of the twenty bits in the RB assignment field can signal the resource block allocation for the first component carrier and the remaining ten bits can signal the resource block allocation for the second component carrier. Alternatively, if the UE is configured to receive the PDSCH on only one component carrier then twenty eight bits can be used for the RB assignment field to signal the RB allocation for that single component carrier. In addition to this, if the UE is configured to receive the PDSCH on only one component carrier, the UE can interpret that the RB assignment bits are signaling a RB assignment in groups of 4 resource blocks each. If the UE is configured to receive the PDSCH on a set of two component carriers, the UE can interpret that the RB assignment bits are signaling resource blocks in groups of 12 resource blocks each. In a different example, the RB assignment bits in PDCCH-2 can be used to signal an offset value to the RB assignment of the anchor carrier (signaled in PDCCH-1) for determining the RB assignment for the component carrier. The RB numbering in each component carrier can be labeled to begin with index 0. If the RB assignment bits in the PDCCH-2 signal an offset value to the RB assignment of the anchor carrier, the UE can add the offset value to the RB indices of the anchor carrier to determine the RB indices for its PDSCH allocations in the component carriers.

The 'HARQ process number (optional)' bits in the PDCCH-2 can be used to signal HARQ process identifier associated with the PDSCH resource assignment for each component carrier in the set of component carriers. Alternatively, if the HARQ process number bits are not signaled in the PDCCH-2, the UE can use the HARQ process number signaled in the PDCCH-1 to determine the HARQ process identifier associated with the PDSCH resource assignment for each component carrier. The 'New Data Indicator' bits are used to signal information that identifies whether the PDSCH resource assignment for each component carrier corresponds to an initial transmission of new data or if the PDSCH resource assignment for each component carrier corresponds to a retransmission of previous data. The RV bits are used to signal information that indicates the RV of the data transmitted on the PDSCH resource assignment.

As shown in Table 2, optional padding bits can be used in the PDCCH-2 to make the size of PDCCH-2 the same as that of one of the existing Rel-8 DCI format sizes. For example, three padding bits can be used in the PDCCH-2 to make its size the same size of a LTE Rel-8 PDCCH message with DCI format—'Format 1'. Having the DCI format size of the PDCCH-2 the same as one of the existing Rel-8 DCI format sizes reduces the number of distinct PDDCH message sizes that a LTE-A UE must blindly decode before detecting the PDCCH-2 message addressed to it, thereby reducing UE complexity.

In an alternative embodiment, a component carrier indicator bit map field may be included in the PDCCH-2 message. The bit map information may indicate the presence and/or absence of a resource allocation for a component carrier. The UE may interpret the bits in the PDCCH-2 depending on the number of component carriers active in the component carrier indicator bit map i.e., the number of component carriers for which resource allocation is present or signaled. For example, a UE configured to receive the PDSCH on a set of two component carriers in addition to the anchor carrier receives in a sub-frame the PDCCH-2 with component carrier indicator bit map indicating only an allocation for one component carrier, the UE interprets the bits in the PDCCH-2 as shown in the "Bit field configuration for one component carriers" column in Table 2. In a sub-frame when the UE receives a component carrier indicator bit map indicating an allocation in two component carriers, the UE interprets the bits in the PDCCH-2 as shown in the "Bit field configuration for two component carriers" column in Table 2.

In another embodiment, the resource allocation in the PDCCH-1 message may correspond to an allocation for a component carrier other than the anchor carrier. A component carrier indicator bit map may be included in PDCCH-2 message including a bit field for the anchor carrier as well as the component carrier. The bit map information may indicate the presence and/or absence of a resource allocation for the carrier. In this embodiment, the anchor carrier bit in the component carrier indicator bit map is disabled i.e., indicating no resource allocation for the anchor carrier. In one embodiment, the component carrier for which the resource allocation in the PDCCH-1 message corresponds to the first component carrier with a presence of a resource allocation as indicated in the component carrier indicator bit map starting from, for example, the most significant bit (MSB) in the bit map field. In an alternative embodiment the component carrier indicator bit map may be included in the PDCCH-1 message by re-mapping some of the bits in an existing Rel-8 compliant DCI format used for the PDCCH-1 to indicate the component carrier indicator bit map. The component carrier indicator bit map may be compressed (e.g., allowing only certain combinations of active carriers) and may be jointly coded with other fields in the control message.

TABLE 3

Contents of PDCCH-2 with multi-component carrier specific information (for a UE configured with a set of 3 or a set of 4 component carriers)

| Field identifier | Bit field configuration for three component carriers | Bit field configuration for four component carriers |
| --- | --- | --- |
| Resource allocation header (optional) | 3 × 1 = 3 | 4 × 1 = 4 |
| Resource Block assignment (offset) | 3 × 14 = 42 | 4 × 10 = 40 |
| MCS (offset) | 3 × 3 = 9 | 4 × 3 = 12 |
| HARQ process number (optional) | 0 | 0 |
| New Data Indicator | 3 × 1 = 3 | 4 × 1 = 4 |
| Redundancy version | 3 × 2 = 6 | 4 × 2 = 8 |
| Padding bits (optional) | 5 | 0 |
| CRC (scrambled with Rel10 C-RNTI) | 16 | 16 |
| Total | 84 | 84 |

Table 2 showed contents of an exemplary PDCCH-2 message that can signal a PDSCH resource assignment information to a UE that is configured to receive the PDSCH on a set one or a set of two component carriers in addition to the anchor carrier. Table 3 shows contents of another exemplary PDCCH-2 message that can signal resource assignment information to a UE is configured to receive the PDSCH on a set of three or a set of four component carriers in addition to the anchor carrier. If the UE is configured to receive the PDSCH on three component carriers in addition to the anchor carrier, the UE can interpret the bits assigned to each DCI field in PDCCH-2 as shown in the "Bit field configuration for three component carriers" column in Table 3. If the UE is configured to receive the PDSCH on a set of four component carriers in addition to the anchor carrier, the UE can interpret the bits assigned to each DCI field in the PDCCH-2 as shown in the "Bit field configuration for four component carriers". For the PDCCH-2 message shown in Table 3, if the UE is configured to receive the PDSCH on three component carriers, the UE can interpret that the RB assignment bits are signaling a RB assignment in groups of 8 resource blocks each. If the UE is configured to receive the PDSCH on a set of four component carriers, the UE can interpret that the RB assignment bits are signaling resource blocks in groups of 12 resource blocks each.

While monitoring the PDCCH region, the UE can choose to look for a PDCCH-2 message whose size corresponds to the set of component carriers it is configured to receive. For example, a UE configured to receive the PDSCH on a set of one or two component carriers will attempt to detect a PDCCH-2 message of size 55 bits (as shown in Table 2). The same UE when configured to receive the PDSCH on a set of three or four component carriers will attempt to detect a PDCCH-2 message of size 84 bits (as shown in Table 3) and will not attempt to detect the 55 bit PDCCH-2 message. Such a UE operation reduces the number of distinct PDDCH message sizes that the UE has to blindly decode before detecting a PDCCH-2 message signaled to it by the base station.

In an implementation where the configuration message identifying the set of component carriers, where PDSCH resource allocations are expected is embedded in an activation PDDCH message (PDCCH-A), the UE is expected to receive only the PDCCH-A or PDCCH-2 in a given sub-frame. The UE can differentiate between the PDDCH-A and the PDCCH-2 using an additional reserved bit in the payload of PDCCH-A and PDCCH-2. Upon reception of PDCCH-A in a given sub-frame, the UE receiver is configured for PDSCH reception on multiple component carriers from the next sub-frame or from a later sub-frame determined based on the sub-frame offset value signaled in PDCCH-A.

If the UE receives a PDCCH-A message and a PDCCH-1 message in the same sub-frame, it then processes the anchor carrier PDSCH resource assignment signaled in the PDCCH-1 and also configures its receiver for PDSCH reception on multiple component carriers based on the information given in the PDCCH-A. In some embodiments, the last symbol in the sub-frame containing the PDCCH-A may be used as a guard period for reconfiguration based on the configuration message embedded in PDCCH-A.

If the UE receives only a PDCCH-2 message in a sub-frame, the UE realizes that it has missed the associated PDCCH-1 message. Under these circumstances, the UE discards the PDCCH-2 message. The base station must resend both the PDCCH-1 and PDCCH-2 in a later sub-frame. If the UE receives only a PDCCH-1 message in a sub-frame and misses a PDCCH-2 message signaled by the base station, the UE uses contents in the PDCCH-1 message to determine its PDSCH resource assignment for the anchor carrier.

In another embodiment, a LTE Rel-10 UE is expected to always monitor the anchor carrier PDCCH region for two (or a fixed) number of PDCCH messages that can be identified with a LTE Rel-10 specific C-RNTI. The UE can then combine the information in the individual PDCCH messages to determine its resource assignments for set component carriers on which the UE is configured to receive PDSCH resource assignments.

For the first and second exemplary implementations, where the PDSCH resource assignments are signaled using individual PDCCH messages on each component carrier, ACK/NACK bits that correspond to the PDSCH assignments on individual component carriers in a given sub-frame can be bundled and transmitted on the anchor carrier. Bundling of ACK/NACK bits can be achieved by performing a logical AND operation on ACK/NACK bits that correspond to the PDSCH assignments on individual component carriers resulting in a single ACK/NACK bit that corresponds to all the PDSCH assignments on individual component carriers. If the bundling of ACK/NACK bits is performed, then a PDCCH message similar to PDCCH-2 could be transmitted in the anchor carrier, with information indicating the component carriers for which PDSCH resource assignments are signaled in the sub-frame. Transmitting such a PDCCH-2 message can help the UE to avoid error conditions while providing ACK/NACK feedback.

In a fourth exemplary implementation, the base station configures the UE via radio resource control (RRC) signaling with an anchor carrier. The UE is expected to only monitor PDCCH messages from the anchor carrier after initial access. To assign resources on multiple component carriers, the base station signals the UE using a PDCCH with a LTE Rel-8 complaint DCI format (PDCCH-1) and an additional PDCCH in the same sub-frame with a LTE Rel-10 specific multi-component carrier information (PDCCH-2). The UE uses DCI information in both the PDCCH-1 and PDCCH-2 to determine its multi-component carrier assignment for the next sub-frame. The one sub-frame delay is introduced to accommodate processing time needed by the UE to both decode the PDCCH messages and also to configure its receiver to receive the PDSCH resource allocations signaled in the PDCCH messages. In one embodiment, the sub-frame delay is indicated in a broadcast control message or a control message by higher layer signaling. The one sub-frame delay introduced between reception of PDCCH messages (PDCCH-1+PDCCH-2) and reception of assigned PDSCH resources can increase the delay between the sub-frame in which the UE receives the PDCCH messages and the sub-frame in which the UE can send an acknowledgement for the PDSCH resources assigned by the PDCCH messages. This in-turn can increase the Hybrid Automatic Repeat ReQuest (H-ARQ) round trip delay between the initial transmission of packets (transmitted on the assigned PDSCH resources) and their scheduled retransmissions in scenarios where the initial transmissions were decoded erroneously. For example, in a LTE Rel-8 system, the H-ARQ round trip delay is 8 ms for a single component carrier PDSCH resource assignment. For a multi-carrier LTE Rel-10 system using this exemplary implementation, the H-ARQ round trip delay for data packets transmitted on PDSCH resources on multiple component carriers will be 9 ms.

In the fourth exemplary implementation, H-ARQ ACK/NACK transmissions made by the UE that correspond to multi-component carrier resource assignments in sub-frame n can overlap with H-ARQ ACK/NACK transmissions made by the UE that correspond to a single component carrier resource assignment in sub-frame n+1. UE processing delay for generating a H-ARQ retransmission for multi-component carrier resource assignments can be 5 ms and UE processing delay for generating a H-ARQ retransmission for single component carrier resource assignments can be 4 ms. If the sub-frame duration is 1 ms, then both H-ARQ ACK/NACK transmissions made by the UE that correspond to multi-component carrier resource assignments in sub-frame n (HARQ1), and H-ARQ ACK/NACK transmissions made by the UE that correspond to a single component carrier resource assignment in sub-frame n+1 (HARQ2), should be transmitted in sub-frame n+5. The UE can transmit HARQ1 and HARQ2 in separate frequency resources in sub-frame n+5. This however increases the peak to average power ratio of the UE's transmission in sub frame n+5 which is undesirable. Therefore, the base station can avoid scheduling a single component carrier allocation in a sub-frame that follows a sub-frame with multi-component carrier allocation. If a sub frame n+1 with single component carrier allocation must follow a sub frame n with multi-component carrier allocation, both PDCCH-1 and PDCCH-2 can be transmitted in a sub-frame n+1 to only schedule the single component carrier resource assignment. This requires the UE to transmit the H-ARQ in sub-frame n+6 thereby avoiding overlap. Such an implementation however may increase PDCCH overhead.

In the above embodiments and exemplary implementations, examples have been provided for the case of single transport block transmission on a component carrier. It is obvious and straightforward for a person skilled in the art to expand the invention to cover other cases such as multiple transport block transmission on components carriers such as with MIMO or spatial multiplexing.

Generally, while all the exemplary implementations discussed herein focus on downlink resource assignments, in some scenarios, they are relevant to uplink resource grants as well.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:
1. A wireless communication terminal comprising:
a wireless transceiver; and
a controller coupled to the wireless transceiver, the controller configuring the transceiver to receive a first control message on an anchor carrier;
the controller configured to determine a Physical Downlink Shared Channel ("PDSCH") resource assignment for the anchor carrier using a first Downlink Control Information ("DCI") in the first control message;
the controller configuring the transceiver to receive a second control message on the anchor carrier, the second control message associated with a set of component carriers, the set of component carriers are distinct from the anchor carrier; and
the controller configured to determine a PDSCH resource assignment on each component carrier in the set of component carriers using both the first DCI in the first control message and a second DCI in the second control message.

2. The terminal of claim 1 wherein the controller is configured to determine a resource assignment for receiving the PDSCH on at least one component carrier in the set of component carriers using both the first and the second control messages based on bit map information.

3. The terminal of claim 2, the control message includes the bit map information.

4. The terminal of claim 1, the first control message is a first PDCCH message and the second control message is a second PDCCH message.

5. The terminal of claim 4, the first control message is a PDCCH message selected from a group of downlink control information [DCI] formats comprising: [0]; [1]; [1A]; [1B]; [1C]; [1D]; [2] or [2A].

6. The terminal of claim 1, the second control message includes resource assignment type information indicating how to interpret the second control message.

7. The terminal of claim 1:
wherein the second control message includes a resource assignment offset for receiving the PDSCH on at least one component carrier in the set of component carriers; and
wherein the controller is configured to determine a resource assignment for receiving the PDSCH on the at least one component carrier in the set of component carriers using the resource assignment offset in the second control message.

8. The terminal of claim 1:
wherein the second control message includes a modulation coding scheme offset for at least one component carrier in the set of component carriers; and
wherein the controller is configured to determine a resource assignment for receiving the PDSCH on the at least one component carrier in the set of component carriers using the modulation coding scheme offset in the second control message.

9. The terminal of claim 1, the controller configured to cause the transceiver to monitor a PDCCH of component carriers activated by a configuration message.

10. The terminal of claim 9, wherein the configuration message is a long term bitmap.

11. A method in a wireless communication terminal, the method comprising:
receiving, at the terminal, a first control message on an anchor carrier;
determining a Physical Downlink Shared Channel ("PDSCH") resource assignment for the anchor carrier using a first Downlink Control Information ("DCI") in the first control message;
receiving a second control message on the anchor carrier, the second control message associated with a set of component carriers, wherein the set of component carriers are distinct from the anchor carrier; and
determining a PDSCH resource assignment on each component carrier in the set of component carriers using both the first DCI in the first control message and a second DCI in the second control message.

12. The method of claim 11 further comprising determining a resource assignment for receiving the PDSCH on at least one component carrier in the set of component carriers using both the first and the second control messages based on bit map information.

13. The method of claim 12, the control message includes the bit map information.

14. The method of claim 11, receiving the first and second control messages as separate first and second physical downlink control channel (PDCCH) messages.

15. The method of claim 14, receiving the first control message includes receiving a PDCCH message selected from a group of downlink control information formats comprising: [0]; [1]; [1A]; [1B]; [1C]; [1D]; [2] or [2A].

16. The method of claim 11, wherein the second control message includes resource assignment type information indicating how to interpret the second control message.

17. The method of claim 11:
wherein the second control message includes a resource assignment offset for receiving the PDSCH on at least one component carrier in the set of component carriers;
the method further comprising determining a resource assignment for the at least one component carrier in the set of component carriers using the resource assignment offset in the second control message.

18. The method of claim 11:
wherein the second control message includes a modulation coding scheme offset for at least one component carrier in the set of component carriers;
the method further comprising determining a resource assignment for receiving the PDSCH on the at least one component carrier in the set of component carriers using the modulation coding scheme offset in the second control message.

19. The method of claim 11 further comprising:
receiving the second control message includes information for at least one component carrier, the information selected from a group comprising a hybrid automatic repeat request process identity, a new data indicator, and a redundancy version; and
determining a resource assignment for receiving the PDSCH on at least one component carrier in the set of component carriers using the information in the second control message.

20. The method of claim 11,
identifying the first control message for the anchor carrier using a first error detection mask,
identifying the second control message using a second error detection mask.

21. The method of claim 11, receiving a configuration message identifying the set of component carriers associated with the anchor carrier.

22. The method of claim 11 further comprising:
receiving a configuration message instructing a set of component carriers whose PDCCH messages are to be monitored; and
monitoring a PDCCH of the component carriers indicated in the configuration message.

* * * * *